July 14, 1953. L. L. MALM 2,645,561
SODIUM SULFATE RECOVERY
Filed Nov. 23, 1948 2 Sheets-Sheet 2

INVENTOR
LAWRENCE LOUIS MALM
BY
ATTORNEY

Patented July 14, 1953

2,645,561

UNITED STATES PATENT OFFICE 2,645,561

SODIUM SULFATE RECOVERY

Lawrence Louis Malm, Rocky River, Ohio, assignor to Industrial Rayon Corporation, Cleveland, Ohio, a corporation of Delaware Application November 23, 1948, Serial No. 61,612

3 Claims. (Cl. 23—121)

This invention relates generally to the separation of anhydrous sodium sulfate from aqueous sulfuric acid liquor systems containing dissolved sodium sulfate. More particularly, the invention relates to a process for the continuous treatment of sodium sulfate-sulfuric acid aqueous liquor systems such as, for example, viscose rayon coagulating baths, which systems are so operated that excess quantities of sodium sulfate and water are continuously formed and the quantity of sulfuric acid therein is continuously depleted.

The objectives of this invention are the reclamation and regeneration of the sulfuric acid and other dissolved organic or inorganic constituents that may be present in such systems in minor quantities, while simultaneously producing and removing therefrom anhydrous sodium sulfate directly, efficiently, and without the intermediate production of Glauber salt ($Na_2SO_4 \cdot 10H_2O$). For the purpose of illustration and to facilitate description, the invention will be described hereinafter as it is employed in the reclamation and regeneration of sulfuric acid coagulating baths employed in the production of viscose rayon.

In general, viscose rayon is produced commercially by the extrusion of an aqueous alkaline cellulosic solution containing sodium cellulose xanthate, commonly known as "viscose," through a spinneret into an aqueous sulfuric acid coagulating bath. The viscose spinning solution usually contains approximately, by weight, 7% to 8% cellulose and 6% to 7% caustic soda. The common coagulating baths usually contain, among other components, approximately, by weight, the following: 6% to 14% sulfuric acid; 12% to 30% dissolved sodium sulfate; from 0% up to 5% or more of other dissolved metallic salts, the most common of which is zinc sulfate; and minor amounts of organic, surface-active materials from about 0.05% to 0.1%, which are employed to prevent spinneret incrustation. In some commercial operations, organic compounds such as glucose in the order of about 2% to 10%, are employed as substitutes for part or all of one or more of the bath constituents.

In the conversion taking place in a coagulating bath where the viscose is converted into regenerated cellulose thread, the sulfuric acid in the bath is consumed by its reaction with the caustic and xanthate in the viscose, forming byproducts such as sodium sulfate, carbon disulfide, hydrogen sulfide, etc. The water content of the bath during spinning is continually increased as the result of the reaction of the caustic soda and the sulfuric acid. In addition, water is introduced by the viscose and by the sulfuric acid which is added to strengthen the bath. For each pound of rayon spun, approximately 9.7 pounds of water and 1.3 pounds of sodium sulfate are produced. Thus, the primary problems in the regeneration and reclamation of such coagulating baths are (a) the removal of excess water and, (b) the removal of excess sodium sulfate.

Several methods have been proposed heretofore for the regeneration and reclamation of the coagulating bath constituents. However, these methods in general, do not provide the degree of economy and efficiency normally expected of reclamation processes. Among the objections to such methods are the excessive costs entailed in equipment outlay, maintenance, power and steam. In one method practiced commercially the used spinning bath is first cooled to produce Glauber salt, and the Glauber salt is either sold as such, discarded or "boiled down" by a separate step to the anhydrous salt.

It has now been found that by employing the novel procedure of this invention, sodium sulfate may be separated directly and efficiently in the anhydrous form from aqueous liquor systems comprising dissolved sodium sulfate and sulfuric acid. In accordance with the present invention an aqueous liquor system containing more dissolved sodium sulfate and water and less sulfuric acid than is desired is treated generally as follows: Water is evaporated from the aqueous liquor system, then while maintaining a sodium sulfate to sulfuric acid ratio of at least about two to one, anhydrous sodium sulfate is caused to precipitate from such evaporated liquor. To the evaporated liquor from which the anhydrous sodium sulfate has been precipitated, sulfuric acid is then added so as to cause an acid sulfate of sodium to precipitate. Substantially all of the precipitated materials are then removed from their mother liquor, and a quantity of water is added to the separated, precipitated materials to dissolve the undesirable solid materials such as the acid sulfates, while allowing the anhydrous sodium sulfate to remain substantially undissolved. The remaining anhydrous sodium sulfate is then separated from its mother liquor.

The process of the invention will be better understood by reference to the accompanying illustrations and also from the descriptions hereinafter of the methods of practicing the invention.

Figure 1:
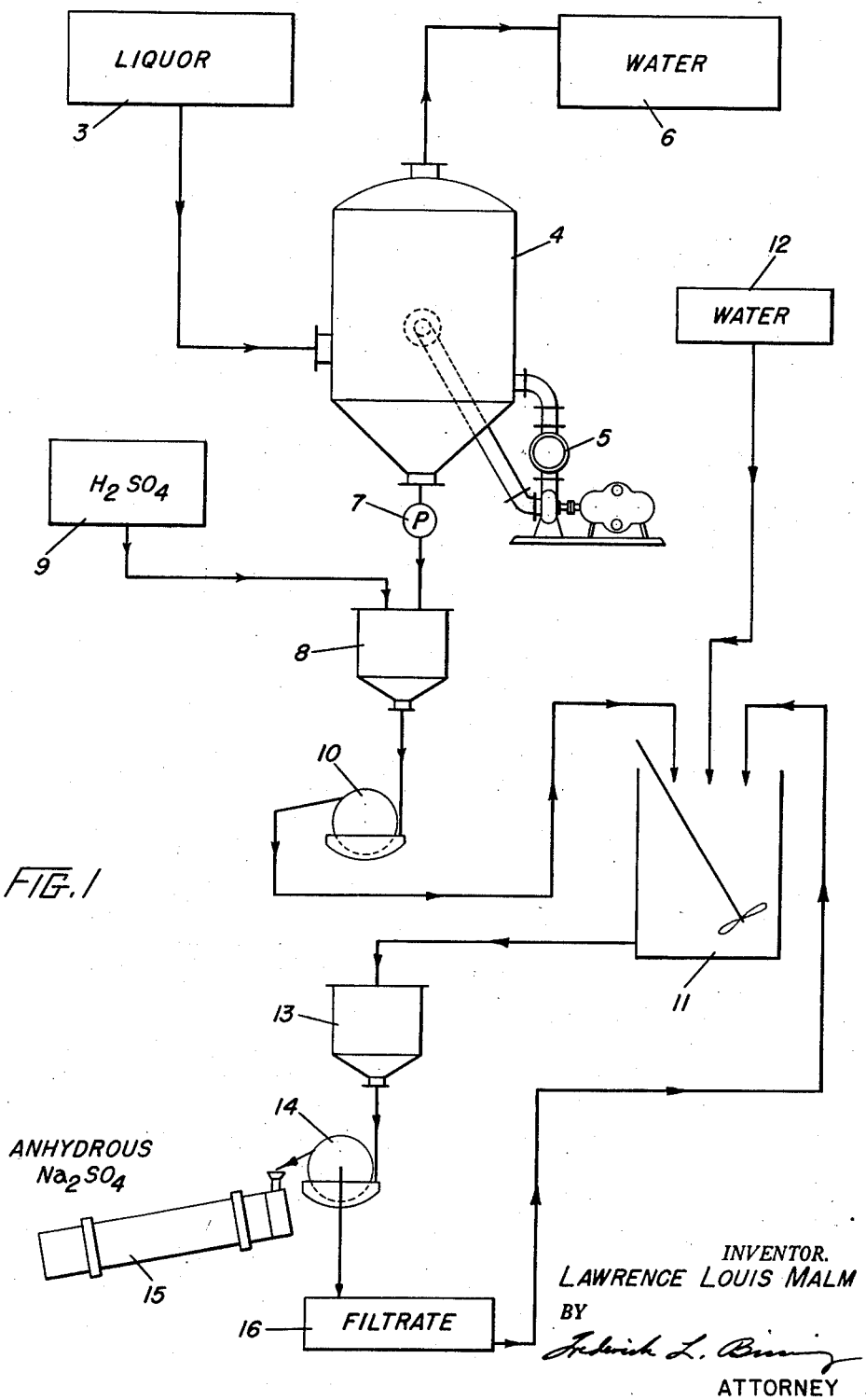
Figure 1 is a diagrammatic illustration of one method of practicing this invention.

In Figure 1, an aqueous sodium sulfate-sulfuric acid liquor system 3 which may, for example, be a viscose rayon, sulfuric acid bath liquor, is introduced into the evaporator 4. The heat and circulating means 5 associated with the evaporator 4 assists in the evaporation and removal of the water 6. The liquor under treatment in the evaporator 4 is adjusted to maintain a sodium sulfate to sulfuric acid ratio, by weight, of at least about two to one. Anhydrous sodium sulfate is caused to precipitate in the evaporator 4 from the adjusted, evaporated liquor at a temperature above 32° C., and the resulting slurry is advanced from the evaporator by the pump 7 to the storage tank 8. A quantity of relatively concentrated sulfuric acid 9, sufficient to precipitate an acid sulfate of sodium, is then added to the slurry in the tank 8, and one or more acid sulfates of sodium are caused to precipitate from the resulting acidified, evaporated liquor therein. The resulting slurry in the tank 8 containing the precipitated materials, is then advanced to the rotary filter 10. The solids separated by the filter 10 are then transferred to the mixer 11 where they are mixed with the water 12 and the sodium sulfate solution 16 for the purpose of dissolving undesirable solids such as acid sulfates, from the anhydrous sodium sulfate solids. The resulting slurry present in the mixer 11 is transferred to the storage tank 13 where equilibrium is attained and then advanced to the rotary filter 14 where the anhydrous sodium sulfate solids are separated and conveyed to the dryer 15. The resulting filtrate 16 which is a substantially saturated sodium sulfate solution is returned as needed to the mixer 11 to be used in dissolving the acid sulfate solids.

In practicing this invention particularly advantageous results are derived by acidifying the evaporated system after the anhydrous salts have been separated. This may be accomplished in Figure 1 by removing the supernatant liquid from the tank 8 to a second tank similar to the tank 8 and then adding sulfuric acid to such separated liquor to precipitate one or more acid sulfates of sodium. Thereafter, at the filter 10, the slurry containing the acid-precipitated material is combined with the anhydrous sodium sulfate slurry from the tank 8 and the remainder of the process carried out as described above. Greater purity of the final product together with the easier handling of the slurries can be achieved when the acid sulfates of sodium are thus precipitated in a separate tank. In addition, this alternative method will reduce the washing necessary to remove the excess acid from the final anhydrous sodium sulfate solids. A more preferred embodiment of this alternative method is described later in the example.

As previously stated, the aqueous sodium sulfate-sulfuric acid liquor systems which may be treated in accordance with this invention are, in general, those which contain more dissolved sodium sulfate and water and less sulfuric acid than is desired in the operation of such liquor systems. Advantageous results are derived when such liquor systems comprise approximately, by weight, 10% to 34% dissolved sodium sulfate and 4% to 17% sulfuric acid. In situations where such liquor systems contain other dissolved metallic salts, further advantages are derived by limiting such salts to not more than about 10%, by weight. When zinc salts such as, for example, zinc sulfate, are present, it is particularly advantageous to limit the quantity of such zinc salts to less than about 5%, by weight, and also to limit the quantity of other dissolved metallic salts to less than about 5%, by weight. Liquor systems which are especially suitable for treatment are the viscose rayon, sulfuric acid coagulating bath liquors previously described.

The water to be evaporated from the liquor system may be removed either by treating the entire system or preferably by treating only a portion of such liquor system. If only a portion of the liquor system is to be treated, it is expedient that the portion selected be large enough to permit that the desired amount of water to be evaporated, while precipitating substantially only the anhydrous sodium sulfate without precipitating any appreciable quantity of the acid sulfates of sodium.

The process of the invention is advantageously carried out by evaporating a quantity of water not more than about 150% of the total amount of excess water calculated to be present in the entire system. In general, it is more advantageous to evaporate a quantity of water which is only slightly in excess of the total amount of excess water, for example, not more than 120%. By the expression, total amount of excess water, is meant the amount of water which must be removed from the liquor system to maintain the water content of the system within the desired specifications. As previously stated with regard to the viscose spinning bath systems, the water content of the system is continually increased during the spinning as the result of the reaction of the caustic soda and the sulfuric acid, and also by the water carried in by the viscose and by the sulfuric acid. During the spinning operation there is also a water loss due to the water removed by the thread leaving the spinning bath and also due to the water continually evaporating from the surface of the bath. The total amount of excess of water as contemplated in the description of the invention, therefore, is the water of chemical reaction plus the water brought in by the viscose and by the sulfuric acid, minus the water removed by the thread and the water evaporated from the surface of the bath.

The maintenance of a sodium sulfate to sulfuric acid ratio of at least about two to one in the evaporated liquor during the precipitation of the anhydrous sodium sulfate, is of importance in the process of the invention. Under these conditions, the solid phase precipitated after evaporation comprises essentially anhydrous sodium sulfate. Where the starting liquor contains appreciable quantities of metallic salts such as zinc sulfate, etc., greater than about 3% and up to about 10%, it is particularly advantageous to maintain the ratio greater than two to one. As long as the desired ratio is maintained during the precipitation, the starting liquor may be in a relatively diluted or concentrated state.

Precipitation of the anhydrous sodium sulfate may be performed in various ways. Advantageously, the evaporation may continue until the anhydrous sodium sulfate is precipitated. In such situations, it is desirable that the heat supplied for evaporation be continued during the precipitation so as to prevent the cooling of the liquor during precipitation of the anhydrous sodium sulfate.

In general, a wide range of temperatures are available for evaporating the starting liquor system, under vacuum or otherwise. Thus, the process may advantageously be adapted to a variety of plant operating conditions. With regard to the precipitation of anhydrous sodium sulfate, special advantages, however, are derived by employing precipitation temperatures above about 32° C. Particularly advantageous are temperatures between about 32° C. and 60° C. and especially between 42° C. and 50° C. In general, at temperatures below 32° C., the costs of operation are increased, since vacuum evaporation is less practical at vacua obtainable with condenser water of normally available temperatures, and further, additional costs would be incurred for equipment, etc., required under such conditions. At temperatures above 60° C., other cost factors such as increased heat losses, etc., must be considered.

After the precipitation of the anhydrous sodium sulfate, sulfuric acid is added to the mother liquor to precipitate one or more acid sulfates of sodium. Such sulfuric acid should advantageously be in a concentrated form so that only a minimum of water is introduced into the treated mother liquor. In this connection, it is advantageous to employ sulfuric acid having a concentration, by weight, of above about 80% and preferably above about 90%.

In general, the quantity of sulfuric acid added to the mother liquor of the anhydrous sodium sulfate solids should be sufficient to precipitate one or more acid sulfates of sodium. By the precipitation of such acid sulfates of sodium, the substantially complete removal of the anhydrous sodium sulfate is assured. By employing the sulfuric acid in this manner, the desired removal of the anhydrous sodium sulfate may be accomplished without excessive evaporation over and above the theoretical excess of water present in the liquor system.

In general, the quantity of sulfuric acid added is dependent upon the amount of water removed by evaporation, more acid being required when lesser amounts of water are removed. As previously stated, the quantity of water evaporated may with advantage be only slightly greater than the total theoretical excess of water, but in some instances, if desired, up to 120 or 150% of theoretical excess may be removed. For example, when only about the theoretical excess water is removed, it is advantageous to add at least about 78% of the total sulfuric acid deficiency in the system, and when 120 to 150% of the theoretical excess water is removed, quantities less than 78% of the total sulfuric acid deficiency may be added.

The sulfuric acid added in this manner is effective in replenishing the sulfuric acid deficiencies in the operating liquor system. If desired, greater quantities of sulfuric acid may be added at this stage up to and including the total amount necessary to replenish the acid deficiencies of the liquor system. It is preferred, however, that only a portion of the total deficiency in sulfuric acid be added at this stage and the balance be introduced into the system later.

In the practice of the invention, the excessive heat-of-solution caused by the introduction of the sulfuric acid into the mother liquor, must be prevented in order to avoid the destruction and charring of heat-sensitive materials such as, for example, organic compounds such as surface-active agents, cellulosic particles, etc., that may be present in systems such as viscose spinning baths.

The addition of the sulfuric acid to the mother liquor of the precipitated anhydrous sodium sulfate causes the ratio of sodium sulfate to sulfuric acid to decrease from the initial ratio of two to one. As previously stated, the amount and concentration of the acid employed must be sufficient to cause an acid sulfate of sodium to precipitate from the acidified mother liquor. As the sulfuric acid is introduced into the mother liquor, it is probable, under certain conditions, that the double acid salt $Na_3H(SO_4)_2$ is precipitated first, followed by the precipitation of the hydrated acid salt $NaHSO_4 \cdot H_2O$ and finally by the precipitation of the normal acid salt $NaHSO_4$. The occurrence of such intermediate solid phases depends largely upon the acid concentration employed and also upon the precipitation temperature employed. However, the presence of such mixtures of sodium acid sulfates in the ultimate acid sulfate salts removed does not affect the operability of the invention. After the sulfuric acid has been added to the mother liquor, the acid-precipitated material is removed and then, if desired, the acidified mother liquor may advantageously be returned to the liquor system. In this manner the acidified mother liquor supplies the sulfuric acid deficiencies existing in the liquor system.

The solid materials which have been separated, consisting primarily of the anhydrous sodium sulfate and the acid sulfates of sodium, are then treated together to separate the anhydrous sodium sulfate in a pure form. The purification may be accomplished by washing with an aqueous solution having a low acid concentration. Since the impurities consist mostly of the acid sulfates of sodium, and since such acid sulfates are more soluble than the anhydrous sodium sulfate, the acid sulfates dissolve leaving solids which are essentially anhydrous sodium sulfate. This separation may be accomplished, for example, by admixing water with the separated, solid materials or with greater advantage by admixing a substantially saturated sodium sulfate solution having a sodium sulfate to sulfuric acid ratio of at least about two to one and then filtering.

If desired, a portion or all of the mother liquor resulting from the purification of the anhydrous sodium sulfate solids may be recycled to a part of the liquor system which is subject to water evaporation for the precipitation of anhydrous sodium sulfate. Such resulting mother liquor also may be combined, if desired, with water and admixed with the above-mentioned separated solids mixture to perform the purification referred to above.

*Example*

Figure 2:
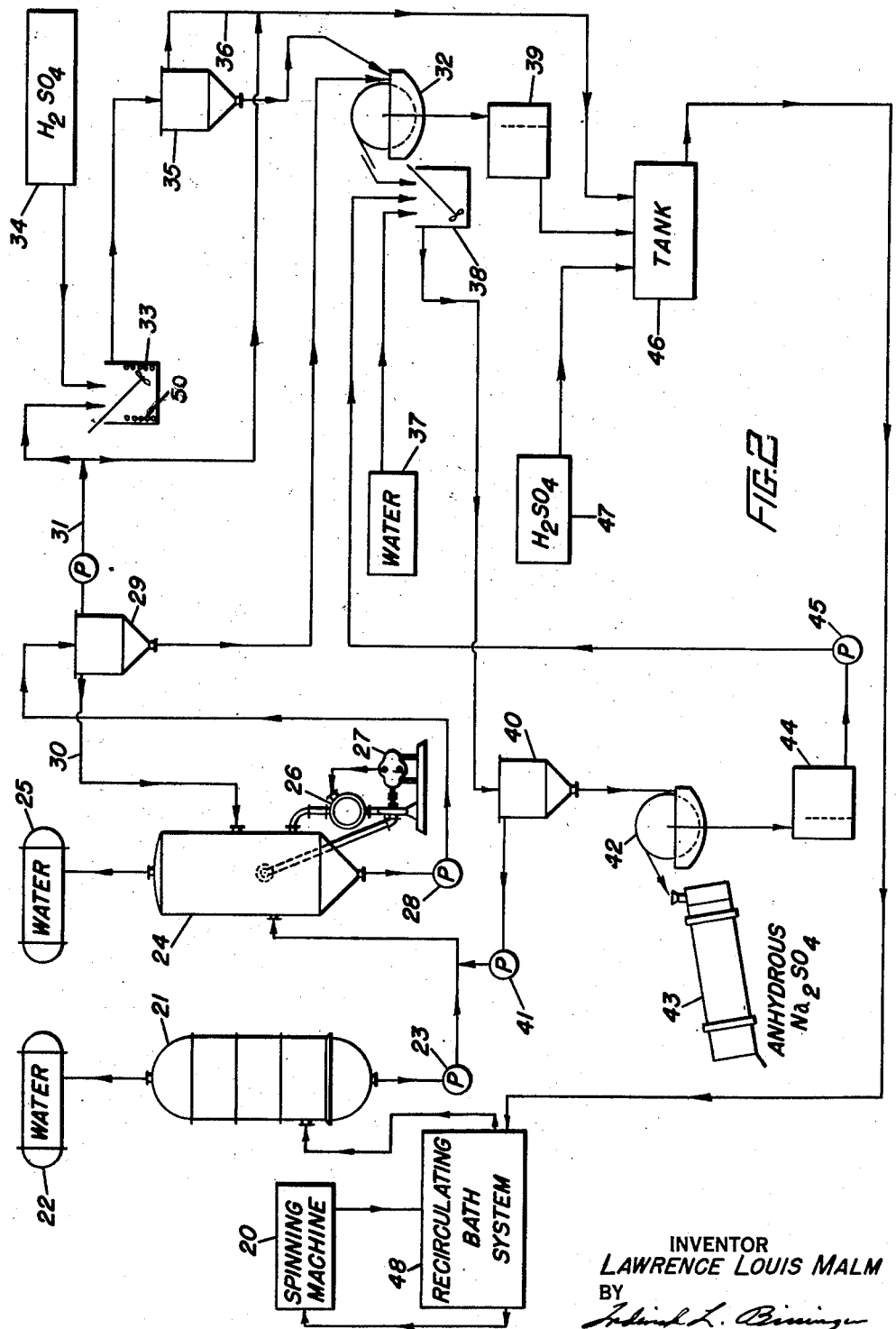
Figure 2 is a diagrammatic illustration of a more preferred method later described in the example.

In this example, the continuous cycle operation illustrated in Figure 2 will be described as it is employed to reclaim and regenerate an operating viscose rayon coagulating bath liquor system comprising approximately, by weight, 9% sulfuric acid, 20% sodium sulfate, 1% zinc sulfate, and 0.06% of an organic surface-active agent. Into this bath is extruded a viscose solution comprising approximately, by weight, 7% sodium hydroxide and 8% cellulose.

To facilitate the description, all of the stated quantities of materials added or removed at any stage of the process represent the total quantities at the end of a twenty-four hour treatment period.

During the processing, herein described, used bath liquor from spinning machine 20 is continually being discharged into the recirculating spin bath system 48. From recirculating bath system 48 of Figure 2, 430,000 pounds of bath liquor is removed comprising approximately 38,700 pounds $H_2SO_4$, 86,000 pounds $Na_2SO_4$, and 305,300 pounds water containing minor amounts of the above described soluble and dispersed materials. This quantity is processed as follows: It is piped to the concentrating evaporator 21 where 120,000 pounds of the water 22 is removed by the application of heat and vacuum while maintaining the liquor at a temperature of about 45° C. The concentrated liquor leaving the evaporator 21 has a total weight of 310,000 pounds, comprising 38,700 pounds $H_2SO_4$, 86,000 pounds $Na_2SO_4$ and 185,300 pounds water. The expression "water" as used in this and other average analyses set forth in this example, is intended to include other minor dissolved or dispersed constituents therein such as the zinc sulfate and the surface-active materials mentioned above. The analysis of the concentrated liquor at this point is approximately, by weight, 12.5% $H_2SO_4$ and 27.7% $Na_2SO_4$. Such liquor is then continuously advanced by the pump 23, together with the excess liquor delivered by the pump 41, to the salting-type evaporator 24 where another 138,600 pounds of water as the water 25 is removed with the assistance of the circulation means 26 and the heat source 27. The contents of the evaporator 24 are maintained at a temperature of about 46° C. During this evaporation, a precipitate consisting essentially of anhydrous sodium sulfate is formed.

The evaporation in the evaporator 24 is carried out with the flows of the incoming solutions, namely, from the pump 23, the pump 41 and the flow 30, adjusted in a manner such that the liquid phase of the slurry, when removed from the bottom of the evaporator 24, contains about 23%, by weight, sulfuric acid and comprises about 42,800 pounds anhydrous $Na_2SO_4$ solids, 194,000 pounds $H_2SO_4$, 270,000 pounds $Na_2SO_4$ in solution and 351,000 pounds water. The removed slurry is advanced by the pump 28 to the settling tank 29 where a heavier slurry is produced. A portion of the overflow 30, which is accumulated in the settling tank 29 is continuously returned to the evaporator 24. The remaining overflow from the settling tank 29, which is indicated as the flow 31, is further processed and utilized as follows: 102,500 pounds thereof, comprising 24,080 pounds $H_2SO_4$, 33,760 pounds $Na_2SO_4$ and 44,660 pounds water is advanced to the receiving tank 46 where it is mixed with other effluents, hereinafter mentioned, to make up the regenerated coagulating bath; while 40,000 pounds thereof, comprising 9,520 pounds $H_2SO_4$, 13,240 pounds $Na_2SO_4$ and 17,240 pounds water is transmitted to the mixer 33. To the mixer 33 is also continuously added, from the tank 34, about 29,000 pounds of 93%, by weight, sulfuric acid at about room temperature and the mixture cooled by the coils 50 in order to dissipate the heat of solution of the sulfuric acid. A temperature of about 46° C. is maintained in the mixer 33, thereby preventing the charring and destruction of the heat-sensitive organic materials present in the liquor. The addition of sulfuric acid causes the precipitation of solids consisting mainly of acid sulfates of sodium. The resulting slurry is then advanced to settling tank 35 where substantal equilibrium between the mother liquor and acid sulfate solids is attained, the solids having an average analysis, by weight, of approximately 55.5% $H_2SO_4$ and 10.7% $Na_2SO_4$. About 25,000 pounds of slurry is removed from the bottom of the settling tank 35 and it is advanced to the rotary filter 32. Such slurry comprises approximately 12,500 pounds acid sulfate solids, 6,950 pounds $H_2SO_4$, 1,340 pounds dissolved $Na_2SO_4$ and 4,210 pounds water. The mother liquor overflows 36 from the tank 35, having a desirably low sodium sulfate content, is piped to the receiving tank 46 where it is mixed with other effluents and piped to the recirculating bath system 48 to replenish and adjust the composition of such bath system. About 44,000 pounds of such overflow 36, comprising about 24,500 pounds $H_2SO_4$, 4,500 pounds dissolved $NaSO_4$, and 15,000 pounds water is piped to the receiving tank 46.

The underflow of the settling tank 35 containing the acid sulfate solids is advanced to the rotary vacuum filter 32 where it is combined with the underflow slurry from the settling tank 29, the latter having a total weight of 85,600 pounds comprising approximately 42,800 pounds anhydrous $Na_2SO_4$ solids, 10,200 pounds $H_2SO_4$, 14,200 pounds dissolved $Na_2SO_4$ pounds 18,400 pounds water. A total of about 55,300 pounds of filtrate is produced at the filter 32 which comprises about 17,150 pounds $H_2SO_4$, 15,540 pounds dissolved $Na_2SO_4$, and 22,610 pounds water. This filtrate is piped to the storage tank 39 and then advanced as needed to the receiving tank 46 where it is combined with the previously mentioned flows 31 and 36 to be returned to the recirculating bath system 48. The solids separated by the rotary filter 32, comprising both the anhydrous $Na_2SO_4$ and the sodium acid sulfate, are transmitted to the mixer 38. 33,600 pounds of the water 37 is then introduced into the mixer 38 to assist in selectively dissolving the acid sulfate solids from the solids mixture therein, the introduction of the water 37 being adjusted in such a manner as to maintain the sulfuric acid concentration of the liquid phase at about 9%, by weight. To maintain such acidity the introduction of the water 37 is further coordinated with the introduction of the final filtrate by the pump 45, subsequently described, which filtrate comprises a substantially saturated solution of sodium sulfate. The introduction of such filtrate is controlled to maintain a continuous supersaturation of $Na_2SO_4$ in the liquid phase in the mixer 38. The resulting slurry in the mixer 38 is then advanced to the settling tank 40 where substantial equilibrium is attained for the purified anhydrous $Na_2SO_4$ solids thus produced. The slurry in the settling tank 40, comprising about 32,300 pounds anhydrous $Na_2SO_4$ solids, 2,900 pounds $H_2SO_4$, 10,300 pounds dissolved $Na_2SO_4$ and 19,000 pounds water, is transmitted to the rotary vacuum filter 42 where the anhydrous $Na_2SO_4$ solids are separated and the filtrate piped to and stored in the tank 44. As previously stated this filtrate is delivered by pump 45 to mixer 38 as needed.

The overflow mother liquor in the settling tank 40 is advanced by the pump 41 to the salting-type evaporator 24 where it is reprocessed. Such recycling is instrumental in increasing the ratio of salt to acid of the liquor undergoing evaporation. The anhydrous $Na_2SO_4$ removed at the filter 42 is advanced to the rotary drum dryer 43 from which it emerges in a marketable condition.

To assist in maintaining the circulation bath system 48 at the proper acidity about 8,160 pounds of 93%, by weight, sulfuric acid is added from tank 47 to tank 46. The combined liquid in tank 46 has a total weight of about 209,960 pounds and comprises approximately 73,560 pounds H₂SO₄, 54,000 pounds dissolved Na₂SO₄ and 82,400 pounds water. This combined liquid is continually advanced to the recirculating spin bath system 48 where further additions are made to replenish the minor constituents such as the zinc sulfate and the surface-active agents previously mentioned which may have been depleted. During the twenty-four hour processing period described, the continuously replenished and regenerated bath system 48 is continuously pumped to spinning machine 20 and portions of the spin bath in the system 48 are continuously subjected to the reclamation and regeneration treatment described.

Under conditions and procedures similar to those described in this example, about 50% to 75% of the calculated total excess sodium sulfate formed may be separated as anhydrous Na₂SO₄ at filter 42. The balance of the excess sodium sulfate formed is carried off by the freshly extruded yarn leaving the spinning bath. This recovery may under certain conditions be achieved by the expenditure of as little as nine pounds of steam per pound of the anhydrous salt separated. This figure may be compared to the sixteen pounds of steam normally required by a two-step method in which Glauber salt is first separated and then independently "boiled down" to the anhydrous salt. The anhydrous sodium sulfate produced in accordance with this example is of standard commercial neutral salt cake grade and purity.

The dissolution of the acid sulfate solids at the mixer 38 can be performed by a variety of methods as previously shown. It is found advantageous, however, to employ the method in the example in which the sulfuric acid concentration in the liquor in mixer 38 is maintained at about 9%, by weight. Such liquor is capable of sufficiently purifying the anhydrous Na₂SO₄ solids present in the tanks 38 and 40 so as to meet commercial specifications. Under the method of the example, further washing of the anhydrous Na₂SO₄ is usually unnecessary.

The acid sulfate solids in the mixer 38 may if desired be dissolved with liquids having higher sulfuric acid concentrations thereby avoiding the introduction of additional water into the system. However, this efficiency may in some instances be offset by the necessity of washing the filtered anhydrous Na₂SO₄ product with additional water to remove acid therefrom.

During the dissolution of the acid sulfate solids at the mixer 38, other solids that may under certain conditions have been separated from the acidified liquor such as, for example, the sulfates of zinc or of other metals, are also substantially redissolved and returned to the bath system.

The process of the invention may be performed, if desired, as a batch method as well as a combination of continuous and batch methods, depending upon the particular operating conditions.

I claim:

1. In the process for treating a viscose rayon, sulfuric acid coagulating bath liquor system containing excess sodium sulfate and water and a deficiency of sulfuric acid, for the reclamation of said excess sodium sulfate as anhydrous sodium sulfate and the regeneration of bath constituents therein, said bath liquor comprising approximately, by weight, 10% to 34% dissolved sodium sulfate, 4% to 17% sulfuric acid and less than about 10% of other dissolved metallic salts; the steps comprising, evaporating from said liquor not more than about 120% of said excess water calculated to be present in said entire system; maintaining in said evaporated liquor a sodium sulfate to sulfuric acid ratio of at least about two to one; precipitating from said evaporated liquor a portion of said excess sodium sulfate as anhydrous sodium sulfate; maintaining the temperature of said evaporated liquor above about 32° C. during said precipitation step; separating substantially all of the precipitated material from its mother liquor; adding relatively concentrated sulfuric acid to said mother liquor in a quantity which is sufficient to precipitate an acid sulfate of sodium but is not more than about the calculated sulfuric acid deficiency of said entire system; precipitating an acid sulfate of sodium from said acidified mother liquor; separating substantially all of the acid-precipitated material from said acidified mother liquor; combining at least part of said separated, initially precipitated material with at least part of said separated, acid-precipitated material; admixing an aqueous solution with said combined, precipitated materials until the undissolved materials remaining constitute essentially anhydrous sodium sulfate, said aqueous solution having a sodium sulfate to sulfuric acid ratio of at least about two to one and being substantially saturated with respect to anhydrous sodium sulfate; separating said remaining anhydrous sodium sulfate from its mother liquor; and thereafter repeating the cycle.

2. In the process for continuously treating a viscose rayon, sulfuric acid coagulating bath liquor system containing excess sodium sulfate and water and a deficiency of sulfuric acid, for the reclamation of said excess sodium sulfate as anhydrous sodium sulfate and the regeneration of bath constituents therein, said bath liquor comprising approximately, by weight, 10% to 34% dissolved sodium sulfate, 4% to 17% sulfuric acid and less than about 10% of other dissolved metallic salts; the steps comprising, evaporating from said liquor not more than about 120% of said excess water calculated to be present in said entire system; maintaining in said evaporated liquor a sodium sulfate to sulfuric acid ratio of at least about two to one; precipitating from said evaporated liquor a portion of said excess sodium sulfate as anhydrous sodium sulfate; maintaining the temperature of said evaporated liquor between about 32° and 60° C. during said precipitation step; separating susbstantially all of the precipitated material from its mother liquor; adding relatively concentrated sulfuric acid to said mother liquor in a quantity which is sufficient to precipitate an acid sulfate of sodium but is not more than about the calculated sulfuric acid deficiency of said entire system; precipitating an acid sulfate of sodium from said acidified motor liquor; separating substantially all of the acid-precipitated material from said acidified motor liquor; returning at least a portion of said acidified mother liquor to any bath liquor deficient in sulfuric acid; combining at least part of said separated, initially precipitated material with at least part of said separated, acid-precipitated material; admixing with said combined, precipitated materials, water and at least a portion of the mother liquor obtained hereinafter from the separation of the anhydrous sodium sulfate, until the undissolved materials remaining constitute essentially anhydrous sodium sulfate; separating said remaining anhydrous sodium sulfate from its mother liquor; returning at least a portion of said latter mother liquor to said separated, precipitated materials undergoing treatment with water; and thereafter repeating the cycle.

3. In the process for continuously treating a viscose rayon, sulfuric acid coagulating bath liquor system containing excess sodium sulfate and water and a deficiency of sulfuric acid, for the reclamation of said excess sodium sulfate as anhydrous sodium sulfate and the regeneration of bath constituents therein, said bath liquor comprising approximately by weight, 10% to 34% dissolved sodium sulfate, 4% to 17% sulfuric acid, less than about 5% dissolved zinc salts and less than about 5% of other dissolved metallic salts; the steps comprising, evaporating from said liquor between about 100% and 120% of said excess water calculated to be present in said entire system; maintaining in said evaporated liquor a sodium sulfate to sulfuric acid ratio of at least about two to one; precipitating from said evaporated liquor a portion of said excess sodium sulfate as anhydrous sodium sulfate; maintaining the temperature of said evaporated liquor between about 32° and 60° C. during said precipitation step; separating substantially all of the precipitated material from its mother liquor; adding relatively concentrated sulfuric acid to said mother liquor while maintaining the temperature of said mother liquor below about 65° C., the quantity of acid added being only a portion of the calculated sulfuric acid deficiency of said entire system and being sufficient to precipitate an acid sulfate of sodium; precipitating an acid sulfate of sodium from said acidified mother liquor; separating substantially all of the acid-precipitated material from said acidified mother liquor; returning at least a portion of said acidified mother liquor to any bath liquor deficient in sulfuric acid; combining at least part of said separated, initially precipitated material with at least part of said separated, acid-precipitated material; admixing with said combined, precipitated materials, water and at least a portion of the mother liquor obtained hereinafter from the separation of the anhydrous sodium sulfate, until the undissolved materials remaining constitute essentially anhydrous sodium sulfate; separating said remaining anhydrous sodium sulfate from its mother liquor; returning at least a portion of said latter mother liquor to said joined, precipitated materials undergoing treatment with water and returning the balance thereof to any bath liquor which is subject to water evaporation for the precipitation of said anhydrous sodium sulfate; adjusting the sulfuric acid concentration of the bath system by the addition of sulfuric acid to replenish its remaining deficiency; and thereafter repeating the cycle, thereby recovering anhydrous sodium sulfate directly and maintaining said viscose rayon coagulating bath continuously within desired sodium sulfate-sulfuric acid specifications during the viscose spinning operation therein.

LAWRENCE LOUIS MALM.

References Cited in the file of this patent

UNITED STATES PATENTS

| Number | Name | Date |
|---|---|---|
| 1,351,672 | Meigs | Aug. 31, 1920 |
| 1,793,649 | Stöckly et al. | Feb. 4, 1931 |
| 1,812,310 | Stöckly et al. | June 30, 1931 |
| 1,953,868 | Richter et al. | Apr. 3, 1934 |
| 2,321,218 | Levermore | June 8, 1943 |
| 2,468,803 | Bonnet et al. | May 3, 1949 |
| 2,521,367 | Hegan | Sept. 5, 1950 |

FOREIGN PATENTS

| Number | Country | Date |
|---|---|---|
| 384,726 | Great Britain | Dec. 15, 1932 |
| 596,086 | Great Britain | Dec. 29, 1947 |

OTHER REFERENCES

Saxton: "The Recrystallization of Niter Coke," J. Ind. and Eng. Chem., November 1918, vol. 10, No. 11, pp. 897–901.